United States Patent [19]
Terrel et al.

[11] 3,854,912
[45] Dec. 17, 1974

[54] COMBINED GREASE TRAP AND AIR FILTER FOR RANGE HOODS

[75] Inventors: Gordon R. Terrel; Robert T. Hause; Alex J. Hancox; Fredrick J. McCulley, all of Kitchener, Ontario, Canada

[73] Assignee: Lau Products, Ltd., Kitchener, Ontario, Canada

[22] Filed: Sept. 11, 1972

[21] Appl. No.: 287,681

[52] U.S. Cl.............. 55/479, 55/316, 55/387, 55/515, 55/525, 55/DIG. 36
[51] Int. Cl............................................. B01d 50/00
[58] Field of Search ...... 55/479, DIG. 36, 316, 384, 55/387–389, 525, 515; 98/115 K; 210/474, 447

[56] References Cited
UNITED STATES PATENTS

| | | |
|---|---|---|
| 1,737,532 | 11/1929 | Allen .................................... 55/387 |
| 2,764,251 | 9/1956 | Jessop................................... 55/316 |
| 2,794,514 | 6/1957 | Risley................................. 98/115 K |
| 2,886,124 | 5/1959 | Scharmer............................... 55/316 |
| 3,017,698 | 1/1962 | Hambrecht et al.................... 55/526 |

Primary Examiner—Bernard Nozick
Attorney, Agent, or Firm—Price, Heneveld, Huizenga & Cooper

[57] ABSTRACT

A combined, self-contained unitary filter element including both a grease trap-type air filter and an air-cleansing or purifying-type filter, in particular, loose, particulate filtration media such as activated charcoal granules, with both types of filter advantageously combined into a unitary, self-contained unit in which the grease trap member forms a dished receptacle for the particulate media.

12 Claims, 5 Drawing Figures

PATENTED DEC 17 1974　　　　　　　　　　　　3,854,912

COMBINED GREASE TRAP AND AIR FILTER FOR RANGE HOODS

BACKGROUND OF THE INVENTION

Kitchen range hoods and like exhaust fan appliances have come into greatly increased usage in recent years, and typically such appliances incorporate a filter of any of a variety of possible types for cleaning contaminants from the air which is being exhausted from one area to another, such contaminants typically including grease, small-scale particulate materials, and undesirable odors, including heavy cooking odors and vapors, and at times smoke.

In kitchen range and cooking burner exhaust hoods, for example, it is practically imperative to incorporate a grease precipitator or trap, since otherwise the grease-laden fumes from cooking will rapidly deposit a heavy layer of grease in the hood, on the exhaust fan and motor, and in any associated ducting, thereby creating a serious and unacceptable fire hazard as well as a source of objectionable odors and filth. In many types of such a hood, the exhaust air is communicated into the ventilation system of the building, and in some such hoods there is no ducting, i.e., the exhaust air is drawn upwardly from the cooking range and then merely exhausted outwardly, back into the room. In an arrangement such as either of the foregoing, it is usually completely unacceptable not to purify or cleanse the exhaust air, in addition to merely removing the grease vapors therefrom, and activated charcoal granules and other similar particulate filter media has become recognized as being reasonably effective for this purpose.

In exhaust apparatus of the type just mentioned, where both grease removal and air purification is required, the typical practice is to incorporate two or more totally distinct and separate filter units, a first such unit being a grease filter or trap, and the second separate and distinct unit being a charcoal granule or other air-cleansing filter unit. Both such filter units have in the past been independently mounted in series fashion within the air passage channel, typically immediately upstream from the blades of the exhaust fan. The separate charcoal granule filter in such systems is by its nature a throw-away item, i.e., the entire unit must be replaced every few months, when the charcoal granules become contaminated. Since this filter unit normally includes a metal frame and metal granule-retention screens and the like, replacement involves a significant expense. This factor, together with the inconvenience involved in making the replacement, has led to the widespread practice of failing to replace these filters as often as should be done, and many times in failure to replace at all, or only at very extended intervals, thereby resulting in the continued use of totally ineffective filters. Thus, the type of filtering apparatus used heretofore has required separate manufacture and storage of each of the two distinctly different types of filters, as well as separate mounting means for each of the different types of filter, and this practice has imposed a penalty in the form of additional size and volume requirements in the manufacture of the range hood, as well as increased costs. Also, the practice has required the ultimate user to always remove the first filter in order to have access to the second, regardless to whether or not the first requires any attention, and has also required the user to throw the entire filter away when only the granules of filter media are contaminated and need replacement; hence, existing types of filters have not facilitated either the design, manufacture, assembly, or the ultimate use of range hoods and like products.

SUMMARY OF THE INVENTION

In its broader aspects, the present invention provides an improvement in range hoods and like exhaust apparatus, and in particular the invention provides a new type of combined and self-contained filter for such apparatus which includes both grease-filtering or trapping means and air-purification means in a single, basically unitary, article. Although self-contained and basically unitary in nature, the improved filter of the invention has a grease trap portion which is nonetheless cleanable with no greater difficulty than prior individual and separate such filter elements, and has replaceable air-purification media; furthermore, the filter unit of this invention requires only a single mounting apparatus, which facilitates both manufacture and removal during subsequent use.

More particularly, the new and improved filter of the invention comprises a grease trap portion having a plurality of tortuous or partially obstructed air passages extending therethrough and formed in an overall configuration which defines a dished receptacle. Such one-forth thus, is both a grease trap or collector and, at the same time, is a repository for an air-filtration or purification media which is disposed and supported in place therein. Preferably, the air filtration media may comprise activated charcoal granules which are loosely confined in bulk within the receptacle defined by the grease trap, wherein such granules may readily and very economically be replaced periodically when contaminated, without replacing the entire filter unit. This makes it possible to realize very significant advantages from the standpoint of expense, since the granules may be replaced at a cost of only about one-fourth the cost of present charcoal filter units, which have to be replaced in total. This, plus the relative ease of actually making the replacement, leads to much more regular replacement by the user, thereby greatly improving the prevailing practice and making it not only possible but likely that the desired goals of air purification will be realized in actual practice.

The major objectives of the invention, and the major advantages provided thereby, will be apparent from the foregoing summary of the basic nature of the invention, although these and other objectives and advantages will no doubt be observed from the following more detailed description.

DESCRIPTION OF PREFERRED EMBODIMENT

Figure 1:
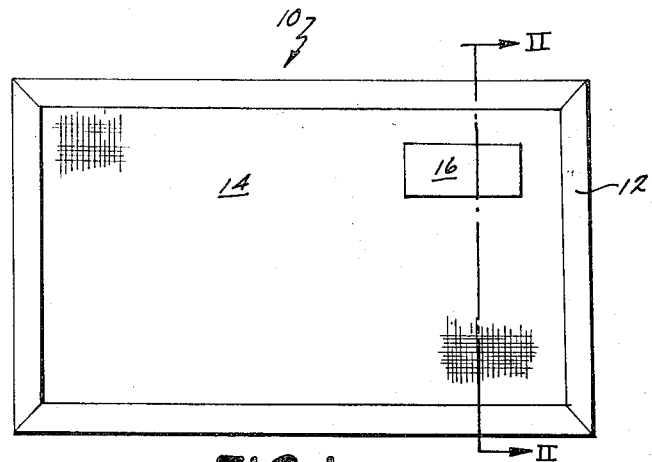
FIG. 1 is an overhead plan view of a combination filter element in accordance with the invention.

As shown in FIG. 1, a typical overall configuration for the filter 10 of the invention is a rectangular member having a peripheral frame 12 and a cover 14 of perforate or mesh material; typically, aluminum expanded metal or screen. As indicated, the cover 14 has a reclosable opening, with a closure member 16 disposed thereon (mentioned in more detail hereinafter). As further illustrated in FIG. 2, the filter 10 is dished in cross section, having a concave lower portion 20 with a peripheral configuration corresponding to the cover 14 and frame 12 illustrated in FIG. 1, but which is deformed into the dished configuration illustrated. This dished configuration defines a receptacle, and within such receptacle is disposed a quantity of air-purification filtering media 22, preferably activated charcoal granules or particles, which essentially fill the entire confines of the dished receptacle.

Figure 3:
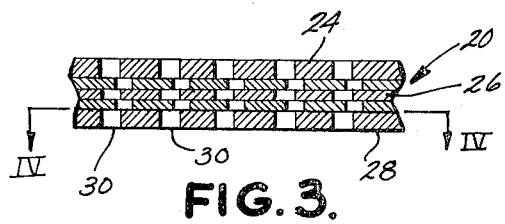
FIG. 3 is a fragmentary, enlarged cross-sectional elevation, taken through the plane III—III of FIG. 2.
Figure 4:
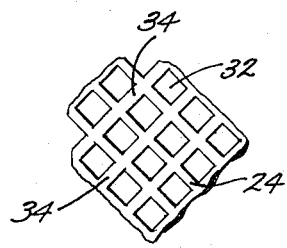
FIG. 4 is an enlarged, fragmentary overhead plan view, taken along the plane IV—IV of FIG. 3.

The lower member 20 provides a grease trap or grease collector, and its preferred structure is illustrated in detail in FIG. 3. Referring to such figure, it will be noted that the member 20 is in effect a sandwich structure, having a bottom layer 28, a top layer 24, and a plurality of medial layers 26. Each such layer may very advantageously be formed of aluminum or like expanded metal, which is a readily-available commercial commodity. For further illustration, the top such layer 24 is illustrated in FIG. 4, from which it will be noted that such a member is thoroughly perforated in character, including a large number of generally equally-spaced and typically diamond-shaped apertures 32. As is well known, these apertures are formed by two-dimensional stretching of the sheet metal after the same has been perforated, thereby enlarging each perforation both laterally and longitudinally and rendering the sheet material extremely pervious to air flow and essentially open and mesh-like in character. Alternatively, it is felt that screen may be used in lieu of expanded metal, if this is desired. As illustrated in FIG. 3, the upper and bottom layers 24 and 28, respectively, are desirably thicker than the medial layers 26. Typically, the expanded metal for the upper and bottom layers may be a 0.015 aluminium stock, whereas the medial layers may be 0.005 stock, although of similarly open character. It may be recognized by those skilled in the art that the sandwich structure grease trap comprising the lower member 20 basically corresponds to known grease trap constructions, at least in the nature of the materials used and the basic sandwich construction; consequently, it may be observed that commercially available layered sheet structures or materials of this type may be purchased and used in the practice of the invention, although such conventional materials will of course require shaping and incorporation into the overall combination described herein.

The dished lower member 20 should have its different layers disposed in a manner such that the different web parts 34 (FIG. 4) which define the boundaries of the apertures 32 in a given layer are aligned vertically with apertures of other layers, to thus intersect the path of air flowing upwardly through the composite member 20. In this manner, grease particles in the air passing through the filter have a high probability of impinging upon one or another of the expanded metal layers, to be collected thereupon and thereby removed from the air being filtered. That is to say, only a relatively small amount of the exhaust air which passes through the filter can possibly move directly through the laminant sandwich filter structure 20, without passing over and around the webs or stringer portions 34; instead, the air passing through this structure will far more likely pass over a number of the webs or stringers 34 and, in this manner, the air passages, such as are designated by the numeral 30 in FIG. 3, may at least in this particular sense be said to be "tortuous", since in their essence they are at least partially obstructed and devious in their essential nature, if not actually curving and occluded.

Figure 2:
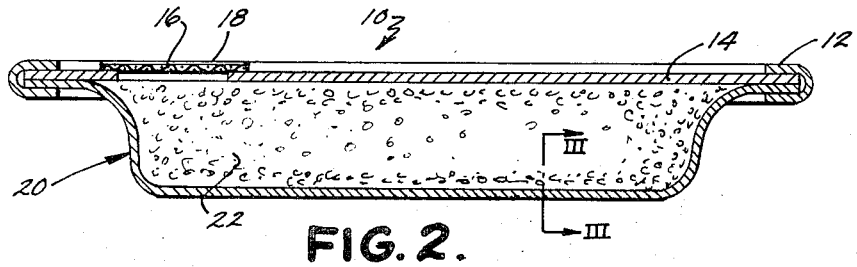
FIG. 2 is an enlarged cross-sectional elevation, taken through the plane II—II of FIG. 1.

In the embodiment shown in FIG. 2, the loose particulate charcoal granules 22, or like filter media, is retained within the dished base or lower portion 20 by the walls of the latter together with the cover 14 mentioned previously. The cover 14 preferably has the same peripheral configuration as the base 20, and rests atop the latter, where it is retained in place by the peripheral frame 12. This frame may advantageously be comprised of V-shaped sheet metal material, which may be made initially from a flat strip reversely bent into the illustrated V-shaped configuration, and which can be crimped to hold the cover securely atop the base. Alternatively, a number of other specific types of frame may be used, since the function of the frame as a retention means for the cover may be implemented in a number of ways, including a plurality of independent clips or, for that matter, spot welding or like techniques may all be used to form an essentially permanent joint. However, it is to be noted that in some possible embodiments, where relatively highly flexible perforate materials are used for the base and/or the cover, the peripheral frame 12 may be made from relatively rigid stock, to lend a desired measure of rigidity to the overall filter construction.

In the embodiment illustrated in FIGS. 1 and 2 and described above, the loose filter media particles 22 may be inserted into the receptacle defined by the lower portion 20 through the access opening 18 (FIG. 2), which constitutes an opening formed through the cover 14. In such a construction, the closure member 16 may very advantageously be implemented by the simple expedient of a piece of pressure-sensitive tape, which can be anchored in place atop the cover by merely pressing the tape onto the cover and over the opening 18. Other forms of a suitable closure for such an opening are, of course, readily implemented, including plugs and pivotal latching doors.

Figure 5:
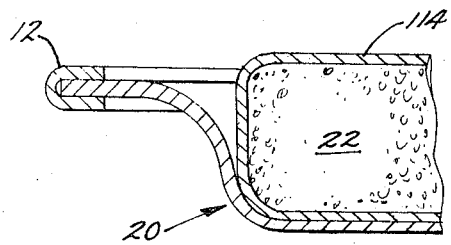
FIG. 5 is a fragmentary, cross-sectional elevational view similar to FIG. 2 but showing an alternative embodiment.

A useful alternative embodiment of the invention is illustrated in FIG. 5, wherein the same basic dished lower portion or base 20 is utilized. In this embodiment, however, a different form of cover is used. That is, instead of a cover sheet 14 which overlies the entire dished receptacle defined by the base 20, a bag-like cover 114 may be used to enclose the filter media particles 22 independently from the dished receptacle. The bag-like cover 114 may advantageously be implemented from fiberglass screen or similar mesh fabric having a mesh opening size sufficiently small to enclose the particles of the filter media, and yet sufficiently permeable for ready passsage of air therethrough. In this construction, the peripheral frame 12 may be used if desired, for example to lend rigidity to the structure and also to provide a smooth and finished edge for the perforate or mesh material comprising the base portion 20, which otherwise can have sharp or jagged edges which can make handling difficult and somewhat hazardous.

The embodiment illustrated in FIG. 5 and just discussed has advantages resulting in large part from human considerations; that is, while an important advantage of the invention is, as discussed previously, the extremely significant cost reduction made possible by the combined filter of the invention and, in particular, in the cost of replacing the particulate air-purification filter media, another significant but less apparent advantage resides in the ease with which the particulate filter media can be replaced. This is extremely important from the standpoint of inducing the user to clean or change the filters as regularly and as often as is really required. While replacing the particulate filter media in the embodiment illustrated in FIGS. 1 and 2 is easy and relatively fast, the ease of replacing this portion of the filter in the embodiment of FIG. 5 is still easier and more convenient since all that is required is to lift out the bag-like container 114 and replace it with a new such element, the cost of which is very much less (on the order of one-fourth) the cost of a completely separate such filter having its own mounting means and being of much more complicated structure. The bag-like container 114 is clean to handle and requires no mechanical manipulation whatsoever, and in fact this construction even facilitates washing of the particulate filter media where one wishes to do so, as commonly occurs, even though such a procedure is often regarded as destroying the activation of the charcoal granules with a consequent reduction in filtering effectiveness. Nonetheless, the practice is frequently followed, and is in all likelihood better than doing nothing at all with a contaminated charcoal filter since some improvement in filtering action almost certainly occurs even as a result of washing.

It may be observed that no precise indications have been given with respect to the size of the apertures or mesh openings in the lower portion 20 or the cover 14, or for the size of the particles used in the air-cleansing or purification media; however, the preferred such media has been identified as activated charcoal granules, and such material is well known as being commercially available for use in air filters. In most instances, this material will be found to be in the form of one-eighth inch particles known as "shot", although in some instances a fragmented and somewhat irregular form is used. As will be apparent, the size of the apertures in the mesh portions of the filter should be such that such portions retain the charcoal granules without allowing the same to pass through the mesh, although it should be pointed out that larger mesh openings can be used in the lower portion if the dished receptacle formed thereby is lined with a mesh material having sufficiently small openings to retain the charcoal granules, as for example glass fiber screen of the type used for the bag-like container 114 of FIG. 5. For example, in the structure of FIG. 5, the base 20 can readily be made of mesh having larger openings than would be required if the same were to act as the only retainer of the filter media particles. In connection with the multiple-layer grease trap material itself, it is pointed out that a material of this type suitable for use as the lower portion of base 20 is commercially available from such companies as Columbus Industries, of Columbus, Ohio, although any commercially-available such material must of course be shaped and contoured, and incorporated into the combination structure of the invention.

It is entirely conceivable that upon examining the foregoing disclosure, those skilled in the art may devise embodiments of the concept involved which differ somewhat from the embodiments shown and described herein, or may make various changes in structural details to the present embodiments. Consequently, all such changed embodiments or variations in structure which utilize the concepts of the invention and clearly incorporate the spirit thereof are to be considered as within the scope of the claims appended herebelow, unless these claims by their language specifically state otherwise.

The embodiments of the invention in which an exclusive property or privilege is claimed are defined as follows:

1. A combination grease trap and air filter, comprising: a perforate grease trap structure having apertured layers sandwiched together such that the apertures in different ones of said layers are non-aligned to thereby define a plurality of at least partially obstructed air passages therethrough, said grease trap structure being of a dished configuration formed of said sandwiched layers and having a predetermined depth and having side and bottom portions defining a receptacle; and a layer of air filtration media disposed and retained within said receptacle.

2. The combination filter of claim 1, wherein said air filatration media comprises particulate material.

3. The combination filter of claim 2, wherein said particulate material comprises discrete loose particles retained in place at least in part by said side and bottom portions of said receptacle.

4. The combination filter of claim 3, and including a cover means extending over the top of said particulate material.

5. The combination filter of claim 4, including frame means engaging said dished grease trap structure for retaining said cover means in place with respect thereto.

6. The combination filter of claim 5, wherein said cover means has peripheral portions disposed generally in alignment with peripheral portions of said dished grease trap structure, and said frame means connects such aligned peripheral portions together.

7. The combination filter of claim 6, wherein said frame means comprises a peripheral frame.

8. The combination filter of claim 6, wherein said cover means comprises a perforate member which closes the top of said receptacle, said cover member having peripheral edges generally matching and in alignment with the peripheral edges of said grease trap structure.

9. The combination filter of claim 8, wherein said cover member defines an opening therethrough for access to the interior of said receptacle, and including a closure member for such opening.

10. The combination filter of claim 4, wherein said cover means comprises a bag-like member containing said particulate material and comprising a unitary replacable element therewith.

11. The combination filter of claim 1, wherein said perforate grease trap structure comprises plural layers of openwork sheet members.

12. The combination filter of claim 11, wherein said plural layers include a top and bottom layer and at least one intermediate layer.

* * * * *